Aug. 28, 1956     G. A. LYON     2,760,606
WHEEL STRUCTURE
Filed Aug. 1, 1952
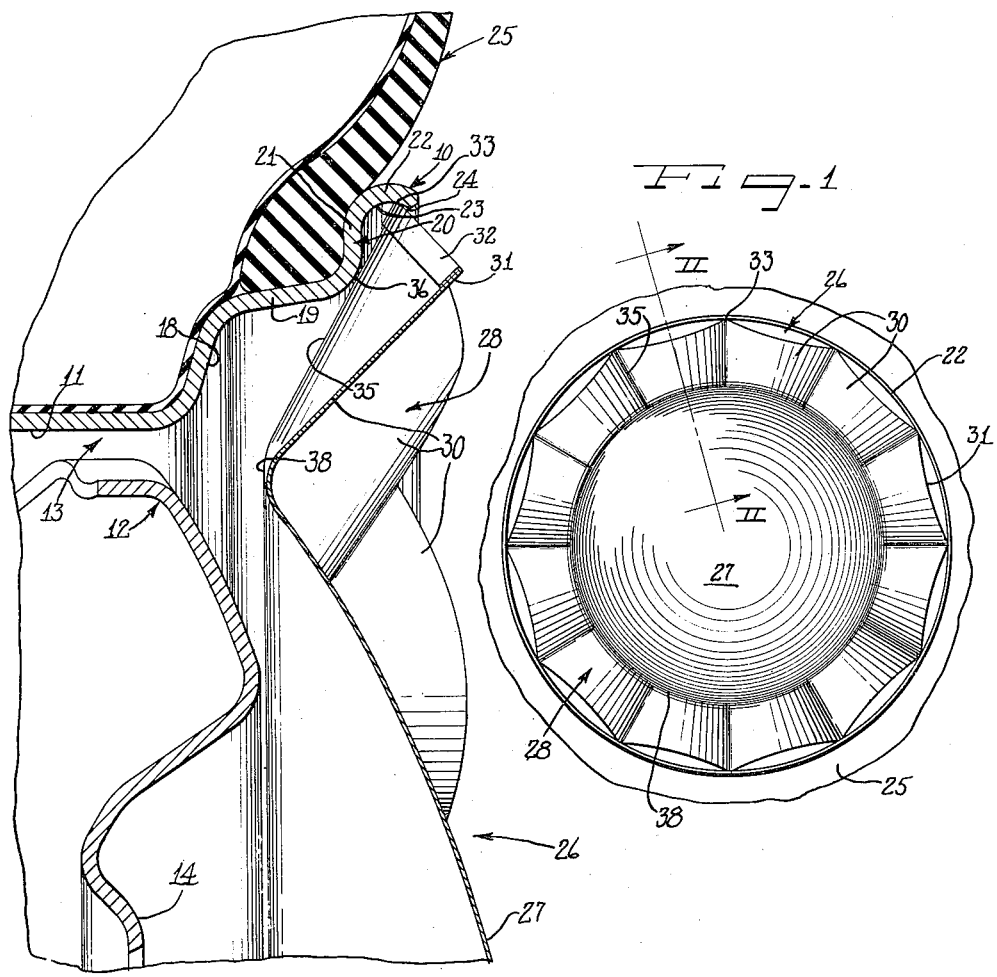
Inventor
George Albert Lyon
By Hill, Sherman, Meroni, Gross & Simpson Attys United States Patent Office 2,760,606
Patented Aug. 28, 1956

2,760,606

WHEEL STRUCTURE

George Albert Lyon, Detroit, Mich.

Application August 1, 1952, Serial No. 302,063

5 Claims. (Cl. 188—264)

The present invention relates to improvements in wheel structures and more particularly concerns improvements in the ornamentation and protection of the outer side of vehicle wheels by means of novel cover structures.

During operation of a vehicle brake, the large amount of frictional energy created between the brake shoes and the brake drum must be dissipated as heat or overheating and damage to the brake may result. Where the brake drum is entirely encompassed by the tire rim and tire assembly, the air about the brake drum tends to stagnate during running of the vehicle instead of circulating for cooling the drum.

An important object of the present invention is to provide in a wheel structure an improved wheel cover having novel means for promoting a vigorous, efficient cooling air circulation through the wheel.

Another object of the present invention is to provide an improved cover which may be easily assembled with a conventional wheel structure and effectively held with the tire rim thereof.

Another object of the present invention is to provide an improved air circulation promoting wheel cover which is radially symmetrical and, therefore, operative when rotated in service on a wheel and translated in any radial direction, to direct air into and through the wheel.

Another object of the present invention is to provide a novel cover structure for the outer side of a vehicle wheel, including improved means for retaining engagement of the cover with the tire rim of the wheel.

Other objects, features and advantages of the present invention will be readily apparent from the following detailed description of a preferred embodiment thereof, taken in conjunction with the accompanying drawings, in which:

Figure 1 is an outer side elevational view of a wheel structure within the scope of the present invention; and Figure 2 is an enlarged fragmentary radial cross-sectional view taken substantially on the line II—II of Figure 1.

As shown on the drawings:

A wheel with which the present invention may be utilized comprises a multi-flange, drop center tire rim 10 which has a base flange 11 thereof secured as by riveting or welding to the outer periphery of a load sustaining central body portion or spider 12. At appropriate intervals, air circulation openings 13 are provided between the wheel spider 12 and the tire rim base flange 11. A central bolt-on flange 14 on the wheel body is adapted to be secured to a vehicle axle structure including a brake drum (not shown).

The tire rim 10 comprises a rolled section of appropriate gage sheet metal and includes a side flange 18, an intermediate flange 19, and a terminal flange 20.

The terminal flange 20 includes a generally radially outwardly extending portion 21, and a generally curved axially outwardly portion 22 providing a generally radially inwardly facing groove 23 defined by a generally radially and axially inwardly facing shoulder 24 at the terminal edge portion of the terminal flange. The flanges of the tire rim are formed in the conventional drop center style adapted to support a pneumatic tire and tube assembly 25.

At its outer side, the wheel is protectively and ornamentally covered by a novel wheel cover 26 which is preferably formed from a single piece of thin sheet metal to provide an overall or full-disk cover unit. To this end, the cover comprises a more or less axially outwardly projecting central crown portion 27 to overlie the wheel body 12, and a marginal generally radially and axially outwardly extending portion 28 arranged to be disposed in substantially concealing relation to the outer side of the tire rim.

The margin portion 28 is a symmetrical generally scalloped configuration including a plurality of peripherally outwardly convexly curved generally radially and axially outwardly projecting flaring rib, scallop portions 30 separated by generally radially and axially outwardly extending straight junction ribs 35. As seen in Figure 2, the outer edge portion 31 of the cover has a reversely bent underturned flange 32 to provide edge finish and reinforcement therefor.

Through the arrangement described, tips 33 are provided at the outer ends of the ribs 35. The symmetrically disposed tips 33 are on a circle of a diameter sufficiently greater than the tip of the terminal flange 22 to require the resilient tensioning of the cover during assembly with the rim.

This in assembling the wheel cover with the wheel, the cover is generally aligned centrally with the tire rim 10 and is pressed generally axially inwardly. During inward movement, the juncture rib tips 33 engage the terminal edge of the terminal flange 20 and are cammed radially inwardly thereabout. As a result the margin portion 28 flexes about a fulcrum provided by a dished circular rib 38 joining the central crown portion 27 with the marginal portion 28. As soon as the tips 33 ride over the shoulder 24, they are snapped by the resilient tension of margin portion 28 into the groove 23 for resiliently wedged retention of the cover with the tire rim.

In final assembled relation of the cover to the tire rim, the juncture ribs 35 extend in opposed relation to an annular juncture shoulder 36 located between the intermediate flange 19 and the terminal flange 20, as indicated in Figure 2. The ribs 35 may abut the juncture 36 if desired to afford a resiliency-improving tensioning back-up for the ribs. It will be appreciated that the ribs 30 and 35 cooperate with the annular rib 38 to resist buckling while resiliently urging the tensioned radially outer tip ends 33 of the ribs 35 into wedging engagement with the terminal flange portion 22.

For removing the cover from the wheel, a suitable pry-off tool may be inserted into the radial openings provided by the scallop portions 30 and levered against the tire rim to progressively pry the cover tips 33 out of engagement with the terminal flange portion 22.

Referring to Figure 2, it will be seen that the margin 31 of the scallops 30 projects axially outwardly beyond the terminal flange 20 so as to intercept the slip stream during the travel of the wheel. The scallops thus tend to scoop air travelling past the wheel at the forward portion of the wheel and direct the air axially inwardly through the air circulation openings 13 in the wheel and around the brake drum to cool the same. The scallop portions 30 at the rear portion of the wheel during travel tend to exhaust air from the adjacent back of the cover and thus from about the brake drum outwardly through the air circulation openings 13 and through the rear scallop cup portions into the slip stream travelling past the wheel. Thus, the cover of the present invention operates both to force cooling air into the region adjacent the brake drum to cool the same as well as to exhaust heated air adjacent the brake drum away therefrom, thus promoting a vigorous, efficient cooling air circulation over and about the brake drum.

It will be understood that modifications and variations may be effected without departing from the scope of the novel concepts of the present invention.

I claim as my invention:

1. In a wheel structure including a wheel body and a multi-flange tire rim having a generally axially outwardly projecting terminal flange with openings through the wheel adjacent juncture of the body and rim, a wheel cover for the outer side of the wheel comprising a circular cover member having its outer margin in closely adjacent relation to the terminal flange of the tire rim, said outer margin being of scalloped configuration and extending generally radially and axially outwardly, with juncture ribs between adjacent scalloped portions retaining engaging at the radially outer ends thereof with the lip of said terminal flange and said scalloped portions arching substantially axially outwardly beyond the tip of the terminal flange lip to thereby provide air channels behind the cover margin to communicate at the outer edge of the cover with the air stream at the outer side of the wheel and at the inside of the cover with said openings.

2. In a wheel structure, including a wheel body and a multi-flange tire rim having a generally axially outwardly projecting terminal flange, a wheel cover for the outer side of a wheel comprising a cover member having its outer margin in closely adjacent relation to the terminal flange of the tire rim, said outer margin being of scalloped configuration and extending generally radially and axially outwardly with juncture ribs between adjacent scalloped portions retainingly engaging at the radially outer ends thereof with the lip of said terminal flange, and said scalloped portions projecting axially outwardly of said terminal flange for intercepting the slip stream travelling past the wheel in operation for circulating air axially inwardly of the cover member.

3. In a cover for disposition at the outer side of a vehicle wheel, a sheet metal cover body having a central portion and a substantially annular outer portion, said outer portion being provided with a circumferential series of generally radially extending axially inwardly and outwardly offset ribs extending to the outer peripheral edge of the cover to thereby afford an undulating shape to said outer edge when viewed in edge elevation, said edge being provided with a continuous sharply reversely turned reinforcing and resiliency imparting wedging flange which follows said undulating shape of the edge for providing stiff wedging retaining engagement by said edge of a wheel flange.

4. In a cover for disposition at the outer side of a vehicle wheel, a circular cover body having a margin extending generally radially and slightly axially outwardly therefrom, said margin being deflected into generally radially outwardly extending alternate narrow and wide ribs terminating on a continuous peripheral edge, said narrow ribs comprising relatively sharply axially bent portions extending radially outwardly with a lesser axial direction than the wide ribs to form stiff struts the outer peripheral ends of which lie on the peripheral edge of the margin and provide tire rim engaging end projections at said edge, and said wide ribs extending out of contact with said rim to provide intermediate air circulation radial channels.

5. In a wheel structure including circular generally radially facing and axially facing portions with the axially facing portion disposed axially inwardly relative to the radially facing portion, a cover for disposition at the outer side of the wheel including a cover body having a generally circular resilient marginal portion of generally scallop-like undulating rib formation with the ribs extending generally radially and providing cover retaining tips engageable under resilient radially thrusting relation against the radially facing annular wheel portion while the ribs extend generally radially across said axially facing wheel portion and have portions thereof engageable against said axially facing wheel portion as an axial stop for the cover and cooperating to maintain said tips in resilient cover retaining thrusting relation against said radially facing wheel portion.

References Cited in the file of this patent

UNITED STATES PATENTS

| D. 143,497 | Lyon | Jan. 8, 1946 |
| 2,143,950 | Kliesrath | Jan. 17, 1939 |
| 2,175,044 | Halteren | Oct. 3, 1939 |
| 2,308,617 | Lyon | Jan. 19, 1943 |
| 2,308,618 | Lyon | Jan. 19, 1943 |
| 2,433,854 | Lyon | Jan. 6, 1948 |
| 2,552,571 | Mercier | May 15, 1951 |
| 2,633,944 | Butterfield | Apr. 7, 1953 |
| 2,639,948 | Grimshaw | May 26, 1953 |